United States Patent
Shatz (10) Patent No.: US 9,652,274 B2
(45) Date of Patent: **\*May 16, 2017**

(54) TECHNIQUES FOR HANDLING MEMORY ACCESSES BY PROCESSOR-INDEPENDENT EXECUTABLE CODE IN A MULTI-PROCESSOR ENVIRONMENT

(71) Applicant: Ravello Systems Ltd., Ra'anana (IL)

(72) Inventor: Leonid Shatz, Ra'anana (IL)

(73) Assignee: Ravello Systems Ltd., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,608

(22) Filed: Dec. 8, 2014

(65) Prior Publication Data

US 2015/0095612 A1 Apr. 2, 2015
US 2017/0003988 A9 Jan. 5, 2017

Related U.S. Application Data

(63) Continuation of application No. 13/483,633, filed on May 30, 2012, now Pat. No. 8,918,608.

(60) Provisional application No. 61/584,590, filed on Jan. 9, 2012.

(51) Int. Cl.
*G06F 9/455* (2006.01)
*G06F 12/109* (2016.01)
*G06F 12/1036* (2016.01)

(52) U.S. Cl.
CPC ........ *G06F 9/4555* (2013.01); *G06F 9/45558* (2013.01); *G06F 12/109* (2013.01); *G06F 12/1036* (2013.01); *G06F 2009/45583* (2013.01); *G06F 2212/657* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 4,240,139 A | 12/1980 | Fukuda et al. | |
| 4,434,459 A | 2/1984 | Holland et al. | |
| 6,427,162 B1 * | 7/2002 | Mohamed | G06F 12/1036 711/E12.065 |
| 6,829,761 B1 | 12/2004 | Sexton et al. | |
| 2008/0201562 A1 | 8/2008 | Nishii | |
| 2008/0209189 A1 | 8/2008 | Yamazaki | |
| 2008/0288941 A1 * | 11/2008 | Adams | G06F 9/45558 718/1 |
| 2010/0161950 A1 | 6/2010 | Caprioli et al. | |

(Continued)

*Primary Examiner* — David X Yi
*Assistant Examiner* — Zubair Ahmed
(74) *Attorney, Agent, or Firm* — Invoke (57) ABSTRACT

A method and apparatus for virtual address mapping are provided. The method includes determining an offset value respective of at least a first portion of code stored on a code memory unit, generating a first virtual code respective of the first portion of code and a second virtual code respective of a second portion of code stored on the code memory unit; mapping the first virtual code to a first virtual code address and the second virtual code to a second virtual code address; generating a first virtual data respective of the first portion of data and a second virtual data respective of the second portion of data; and mapping the first virtual data to a first virtual data address and the second virtual data to a second virtual data address.

20 Claims, 3 Drawing Sheets

(56) References Cited

U.S. PATENT DOCUMENTS

2011/0040954 A1  2/2011 Nishii
2014/0082253 A1* 3/2014 Macpherson ............. G06F 9/06
                                            711/6

* cited by examiner

TECHNIQUES FOR HANDLING MEMORY ACCESSES BY PROCESSOR-INDEPENDENT EXECUTABLE CODE IN A MULTI-PROCESSOR ENVIRONMENT

CROSS-REFERENCE TO RELATED APPLICATIONS

This application is a continuation of U.S. patent application Ser. No. 13/483,633 filed on May 30, 2012, now allowed, the contents of which are incorporated herein by reference.

TECHNICAL FIELD

The invention generally relates to virtual machines (VMs), and more specifically to execution of a guest in a para-virtualized environment, execution of operating systems on architectures with virtual memory, and instruction sets with program-counter (PC) relative addressing.

BACKGROUND

There are many cases where it is necessary to execute the exact same executable code on a plurality of processors and to provide fast memory access to data on a per-processor basis. According to prior art techniques, the executable code is copied for each processing unit instance into physical memory in a different location and executed therefrom, with further allocation for each processing unit storing data memory. In cache-based systems, the repeated copying or instancing of the same instructions into different areas of the memory often results in waste and thrashing of the cache content, thereby lowering performance or requiring larger memories.

In the Intel® IA-32e and Advanced Micro Devices® (AMD) 64-bit processors' architectures, the legacy GS register (which is used for segmentation addressing in 32-bit mode) is retained in vestigial form for use as an extra base pointer to operating system structures in 64-bit addressing space. The fast access to per-processor structure is possible with the use of the new kernel GS register and a "swapgs" instruction. This allows to somewhat overcome the problems discussed above with regard to the copying of the code. However, if GS and/or kernel GS registers are in use by a guest operating system of a virtual machine (VM), these registers cannot be used by the hypervisor's code to access the per-processor structures of the hypervisor itself.

A guest operating system (or simply "guest") is an operating system that is installed on a virtual machine in addition to the host (main) operating system running on the hardware system. A guest is controlled by a hypervisor. The hypervisor presents to the guest a virtual operating platform and manages the execution of the guest. Multiple instances of operating systems may share the virtualized hardware resources. In full virtualization architecture, the hypervisor sufficiently simulates the hardware on which the guest executes, such that no modification is required to the guest. Another virtualized environment is para-virtualization in which a software interface is used to allow the handling and modifying of the guest.

Regardless of the virtualization environment, or otherwise, current solutions for support execution of the same portions of code by multiple processors requires either copying of the code, or does not allow sharing of the GS registers.

It would be therefore advantageous to provide a solution that overcomes the deficiencies of the prior art.

SUMMARY

Certain embodiments disclosed herein include an apparatus for virtual address mapping. The apparatus comprises a first memory unit including a plurality of code portions mapped to a plurality of respective code virtual address starting points, wherein each code virtual address starting point of the plurality of respective code virtual address starting points is set apart from at least one other code virtual address starting point of the plurality of respective code virtual address starting points by an offset of a plurality of offsets; a second memory unit including a plurality of data portions, each data portion respective of a code portion of the plurality of code portions, mapped to a plurality of respective data virtual address starting points, wherein each data virtual address starting point of the plurality of respective data virtual address starting points is set apart from at least one other data virtual address starting point of the plurality of respective data virtual address starting points by the offset of the plurality of offsets used to set apart a code virtual address of the respective code portion; and a memory management unit configured to map each code portion of the plurality of code portions to a first memory unit address of the first memory unit, wherein the memory management unit is further configured to map each data portion of the plurality of data portions to a second memory unit address of the second memory unit.

Certain embodiments disclosed herein also include a method for virtual address mapping. The method comprises determining an offset value respective of at least a first portion of code stored on a code memory unit, wherein the first portion of code is associated with a first portion of data stored on a data memory unit and the second portion of code is associated with a second portion of data stored on the data memory unit; generating a first virtual code respective of the first portion of code and a second virtual code respective of a second portion of code stored on the code memory unit; mapping, by a memory management unit, the first virtual code to a first virtual code address and the second virtual code to a second virtual code address; generating a first virtual data respective of the first portion of data and a second virtual data respective of the second portion of data; and mapping, by a memory management unit, the first virtual data to a first virtual data address and the second virtual data to a second virtual data address.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments of the disclosed embodiments are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In a system where a plurality of processing units may execute a shared code independently, it is necessary to address data related issues. According to various embodiments disclosed herein, a per-processing unit data can be efficiently addressed in a program counter (PC) relative (PCR) mode where data is accessed using a common offset value for each processor. As a result, while each of the processing units access the exact same instruction code stored in physical memory, the processor accesses a different area in memory for manipulation of data.

Figure 1:
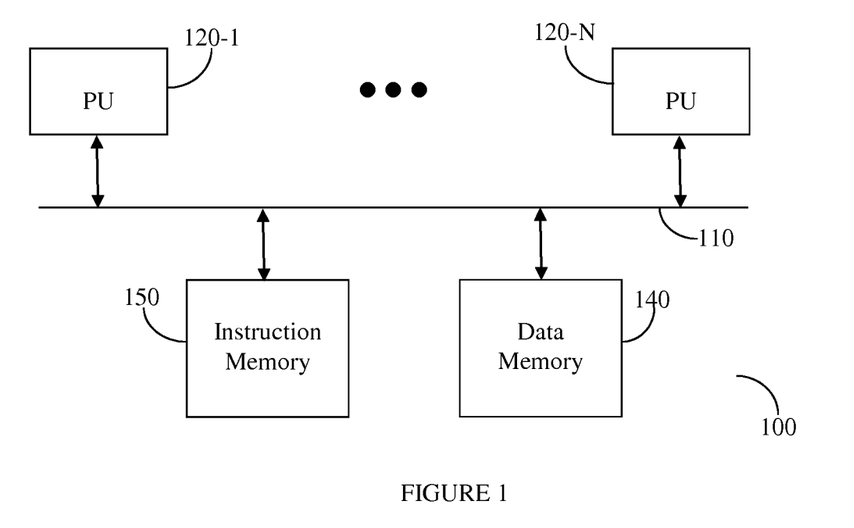
FIG. 1 is a schematic diagram of a system having a plurality of processing units that execute the same code from an instruction memory.

FIG. 1 depicts a system 100 comprising a plurality of processing units (PUs) 120-1 through 120-N (hereinafter referred to collectively as Pus 120, or individually as a PU 120) connected by a communication bus 110. The communication bus 110 may include, but is not limited to, a serial communication line, a data bus, a network, and any combination thereof. The network may be, but is not limited to, a local area network (LAN), wide area network (WAN), metro area network (MAN), the Internet, the worldwide web (WWW), a wired or wireless network, and any combination thereof. Each of the PU 120-1 through 120-N may be, but is not limited to, a CPU, a controller, a microcontroller, a multi-core processor, a core of a multi-core processor, and the like as well as instantiations of same in a virtual environment.

A memory that may be partitioned virtually or physically to an instruction memory 150 and a data memory 140 is connected to the communication bus 110 (the memory is shown in FIG. 1 as the partitioned data memory 140 and Instruction memory 150). The instruction memory 150 contains at least a group of a plurality of instructions that begin at a known address and that are to be accessed by at least two of the plurality of PUs 120. Typically, the system 100 comprises logical and physical addresses to access the instruction memory 150 and the data memory 140.

In a non-limiting embodiment, the system 100 can operate in a para-virtualized or full-virtualized mode where the execution of a plurality of guests, a hypervisor, and a host over the PUs units are allowed. As mentioned above, when a VM of a guest uses the GS and/or kernel GS registers, these registers cannot be used by the hypervisor's code to access the per-PU structures of the hypervisor itself. To execute the exact same executable code by, for example, two guests, two hosts, or one guest and one host executing on a plurality of PUs, the GS registers cannot be utilized to provide fast access to the per-PU structures.

According to certain embodiments disclosed herein, all instances of the code are mapped by, for example, a memory mapper of the host, to the same physical address of the instruction memory 150 of the system. As a result, it is assured that there is only a single copy of the instructions to be executed. In addition, but not by way of limitation, the mapping may further prevent cache overloading for certain types of cache implementations (e.g., physically-indexed cache and physically tagged (PIPT) cache) when used in conjunction with either the instruction memory 150 or the data memory 140. It should be noted that, while the data memory 140 and the instruction memory 150 are shown as separate memories, it is possible to have them in the same physical memory but in different address spaces.

Figure 2:
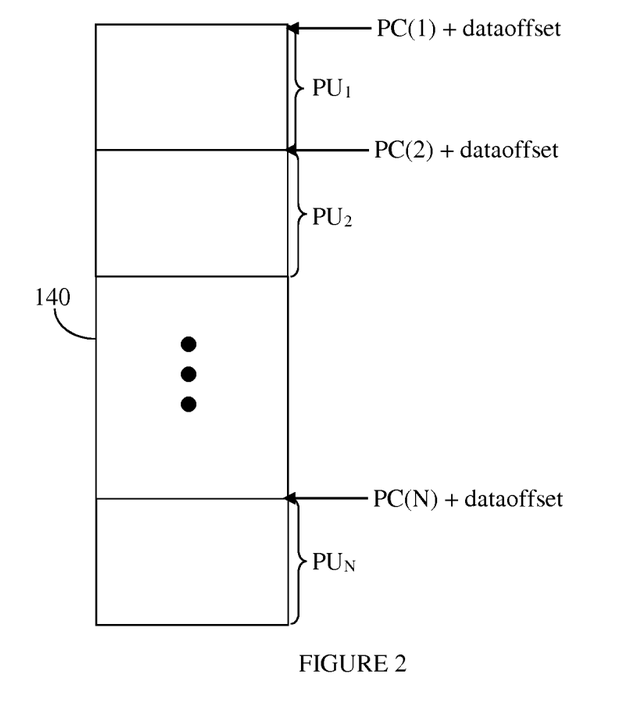
FIG. 2 is a schematic diagram of the data memory according to an embodiment of the invention.

All access of data in the data memory 140 by the code in the instruction memory 150 is performed as a PCR access with an offset value. A basic memory map for the data portion is shown in FIG. 2. The offset value is large enough to move outside of the memory page boundaries of the code and is different for each instance executing on a PU 120. In an embodiment, a calculation of a data address may be performed as follows:

$$\text{data\_address}(m) = [PC(m)] + \text{dataoffset}$$

where, virtual memory mappings may be created such that:

$$PC(m) = PC(1) + \text{pcoffset} * (m-1)$$

and virtual memory address of per-PU data block, i.e., the address for each data block made available to each PU, is calculated for each PU-m as $$\text{data\_block}(m) = \text{data\_block}(1) + \text{pcoffset} * (m-1)$$

where m is an integer having values 1, 2, ... N, N is the maximum number of processing units (PUs) in the system, and PC(m) is the PC of a respective PU(m). The value of pcroffset must be larger than the difference between the first instruction's address that accesses data and the last instruction address that accesses data for the same code portion. The value of dataoffset determines the location of a specific data item within a data block pointed to by [PC(m)]. Typically, this is rounded up to a memory management unit (MMU) page size integer multiplier. For example, if the code spans an address space of H'FFFF, then the offset value can be H'10000, which ensures that the data for each PU 120 will be at a separate location in the memory while the same code is used. The basic memory map for the data portion is shown in FIG. 2.

The data offset is set for each code instruction as a difference between the program counter and the data object in a data memory block associated with a first processing unit such as, e.g., PU 120-1. This is achieved by the virtual memory mappings as discussed hereinabove. It should be understood that, according to an embodiment, all PUs 120 have the same data offset. Furthermore, the associated per-PU 120 data blocks are set apart from each other by the same offset as instruction code blocks for each PU 120. With the memory mappings defined as described hereinabove, each one of the PUs 120 can access its per-PU 120 data block using a single physical copy of the instruction code. This holds true for every code instruction instance having access to per-PU data according to the principles of this invention. It should be understood that data offsets may vary from one instruction instance to another. However, once determined, the data offsets shall remain equal for all PUs 120 relative to the PCR addressing mode.

Figure 3:
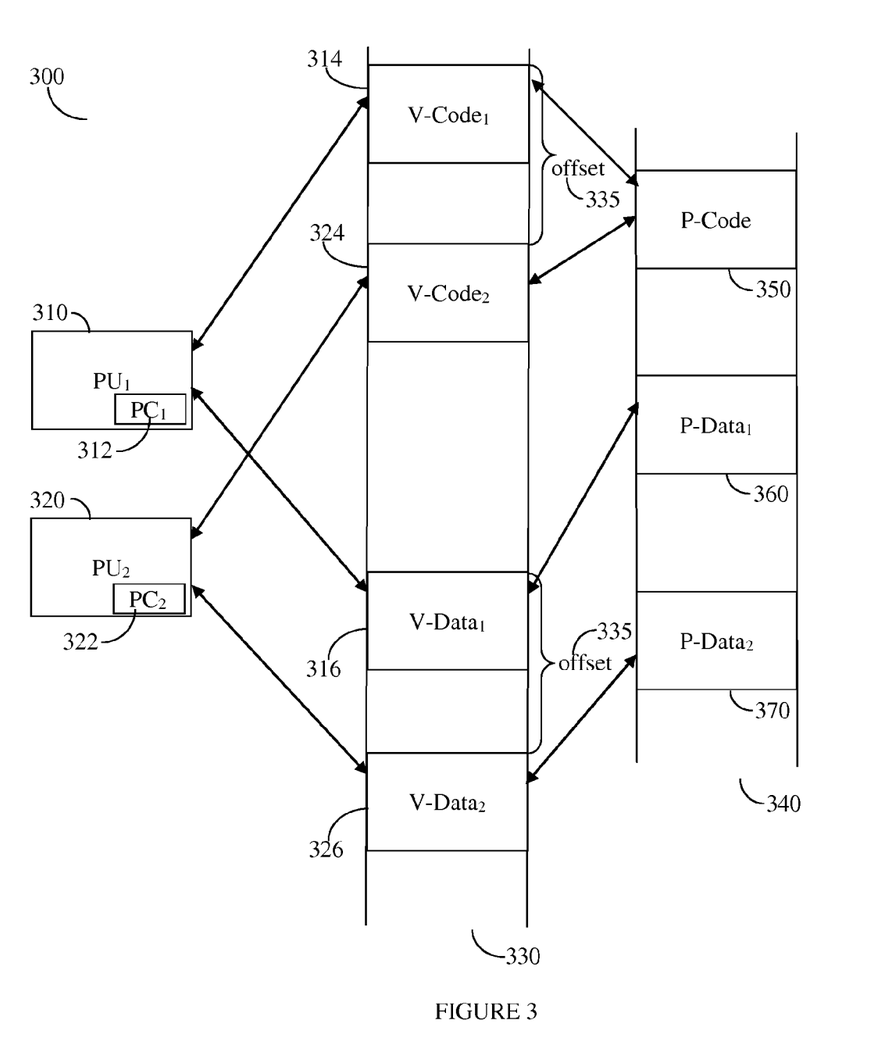
FIG. 3 is a diagram showing a single physical copy of executable code used with respect to two processors while separate data memory portions are used for the same code according to one embodiment.

An exemplary and non-limiting schematic diagram 300 of a single physical copy of executable code used with respect to two processors while separate data memory portions are used for the same code according to an embodiment is shown in FIG. 3. Two PUs 310 and 320 are shown, each having a respective program counter 312 and 322, wherein the program counters used for the PCR address access are explained hereinabove. Each of the PUs 310 and 320 accesses, at least in part, the same code portion 350 in a physical memory 340. Using a memory management scheme, the physical code (P-Code) 350 is mapped for each of the PUs 310 and 320, to two different virtual codes (V-codes) 314 and 324, respectively, in a virtual memory 330, and at a predefined offset 335, as explained in more detail hereinabove. Specifically, the code is stored in the code portion 350 of the physical memory 340, which is equivalent to the physical memory 150 of FIG. 1, and the data is stored in data portion 360 and data portion 370 of physical memory 340. The physical memory 340 is equivalent to the physical memory 140 of FIG. 1 when the memories 140 and 150 are in the same memory. In this way, each of the PUs 310 and 320, by means of their respective program counters 312 and 322, access the same P-Code 350 through mapping of the respective V-codes 314 and 324. This ensures that a single copy or instance of the common portion of code is used in the physical memory 340.

Using the mapping scheme discussed hereinabove, the PUs 310 and 320 access physical data portions 360 and 370, respectively, of the physical data memory 340. Such access is performed using data PCR addressing, which is performed through the respective virtual data (V-data) portions 316 and 326, placed at a distance which is the same as predefined offset value 335. Hence, by using the solution discussed hereinabove, the same code may be used a plurality of times without having multiple copies thereof, while the data portions remain separate and accessible by the respective PU. While the description herein is with respect to two PUs and their respective instruction and data blocks, such an embodiment is merely an exemplary embodiment and should not be viewed as limiting the disclosed embodiments.

Figure 4:
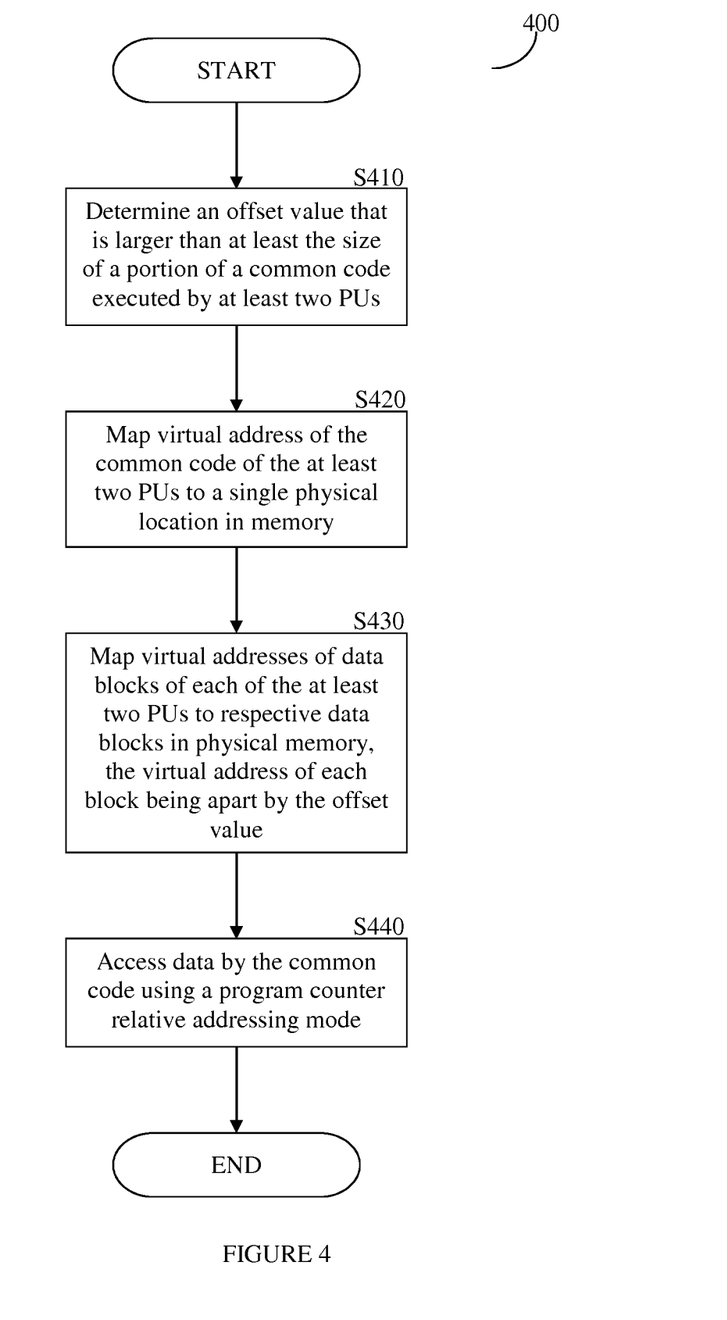
FIG. 4 is a flowchart illustrating a method for executing a single physical copy of a portion of independently executable code by at least two PUs during the access of different data blocks by each PU according to one embodiment.

FIG. 4 shows an exemplary and non-limiting flowchart 400 illustrating a method for executing a single physical copy of a portion of code executed independently by at least two PUs while accessing at least two different data blocks, wherein there is one data block for each PU (e.g., the PUs 120). The method is performed by at least one of a host operating system or a hypervisor. The method is typically performed when preparing a portion of code to be executed in the described environment and thereafter as access to the physical memory is performed according to the method.

At S410, an offset value that is larger than or equal to the length of the portion of the executable code is determined. At S420, the different virtual addresses of a portion of common code, to be executed by each PU, are mapped to a single physical address. The virtual addresses allocated for each PU are set apart from each other by the offset value determined at S410.

At S430, the address spaces in the virtual memory of data blocks respective of each PU that needs to execute the portion of common code are mapped to physical addresses. The virtual addresses are set apart by the offset value. The data blocks may be used by the PUs to execute the portion of common code to store and retrieve data therein that is different for each PU and therefore cannot be shared.

At S440, during execution of the portion of the common code independently by each PU executing the common code, each such PU accesses the same copy of the portion of common code in the physical memory through the mappings of the respective virtual address. Access to data blocks by each PU executing the portion of common code is performed using a PCR addressing respective of the virtual addresses of the data and the computed offset, as explained hereinabove in greater detail.

The embodiments disclosed herein may be used in virtual machines (VMs), and more specifically for execution of a guest in a para-virtualized environment, and can be also useful for operating systems running on architectures with virtual memories and instruction sets with PCR addressing. It should be further noted that the disclosed embodiments may be used exclusively for addressing all data and instruction portions; however, this is not required and the disclosed embodiments can be used in conjunction with other methods of data and instruction access such that a portion of the data and instructions are accessed in a PCR mode as explained hereinabove, and other portions are accessed differently.

A person of ordinary skill in the art would recognize that both physical and virtual instantiations may benefit from the embodiments disclosed herein. Hence, processing units may be both physical devices and virtual devices executing on other virtual or physical devices at an as deep as required hierarchy. Similarly, the memories may be virtually mapped to physical memories directly, and virtual memories may be mapped to other virtual memories that are then mapped to physical memories in an as deep as required hierarchy. All such embodiments should be considered an integral part of the invention.

The embodiments disclosed herein may be implemented as hardware, firmware, software, or any combination thereof. Moreover, the software is preferably implemented as a program, for example as a part of system program such as, and without limitations, an operating system or hypervisor, tangibly embodied on a program storage unit or tangible computer readable medium consisting of parts, or of certain devices and/or a combination of devices. The program may be uploaded to, and executed by, a machine comprising any suitable architecture. Preferably, the machine is implemented on a computer platform having hardware such as one or more central processing units ("CPUs") and/or controllers, and/or microprocessors, and other processing units, a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A non-transitory computer readable medium comprising code which, when executed by one or more hardware processors, causes performance of operations comprising:
configuring a same particular offset value for separating virtual memory regions corresponding to instruction sets and separating virtual memory regions corresponding to data sets;
identifying a first virtual memory region corresponding to a first set of instructions to be executed by a first Processing Unit (PU);
identifying a second virtual memory region corresponding to a second set of instructions to be executed by a second Processing Unit (PU);
wherein the first virtual memory region and the second virtual memory region are separated by the particular offset value;
mapping both the first virtual memory region and the second virtual memory region to a same particular physical memory region;
identifying a third virtual memory region corresponding to a first data set to be processed by the first PU for execution of the first set of instructions;
identifying a fourth virtual memory region corresponding to a second data set to be processed by the second PU for execution of the second set of instructions;
wherein the third virtual memory region and the fourth virtual memory region are separated by the particular offset value;
mapping the third virtual memory region and the fourth virtual memory region to different respective physical memory regions;
executing Program Counter (PC) relative addressing for (a) accessing the first data set referenced by a first instruction in the first set of instructions and (b) accessing the second data set referenced by a second instruction in the second set of instructions, wherein the first instruction and the second instruction are the same instruction.

2. The medium of claim 1, wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region.

3. The medium of claim 1, wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions.

4. The medium of claim 1,
wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region; and wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions.

5. The medium of claim 1, wherein the particular physical memory region corresponds to an instruction memory partition and wherein the different physical memory regions, corresponding to the first data set and the second data set, correspond to a data memory partition.

6. The medium of claim 1, wherein the instruction memory partition and the data memory partition correspond to different address spaces in a physical memory system.

7. The medium of claim 1, wherein an address in the third virtual memory region is determined based on a start address corresponding to a first Program Counter (PC) and an offset.

8. The medium of claim 1, wherein a physical address in a second physical memory region, corresponding to the third virtual memory region, is determined based on a start address corresponding to a first Program Counter (PC) and an offset.

9. The medium of claim 1, wherein each of the first PU and the second PU are associated with a same data offset to be applied when accessing the first set of data and the second set of data, respectively.

10. The medium of claim 1, wherein the first virtual memory region and the second virtual memory region are (a) in a same virtual memory block and (b) have starting addresses that are set apart from each other by an offset value that is larger than or equal to memory space required to store the first set of instructions.

11. The medium of claim 1, wherein the operations further comprise executing a guest, in a para-virtualized environment, associated with at least the first set of instructions and the first set of data.

12. The medium of claim 1, wherein each of the first data set and the second data set are addressed in a Program Counter Relative (PCR) mode using a common set of offset values for each of the first PU and second PU respectively.

13. The medium of claim 1,
wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region;
wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions;
wherein each of the first data set and the second data set are addressed in a Program Counter Relative (PCR) mode using a common set of offset values for each of the first PU and second PU respectively;
wherein the particular physical memory region corresponds to an instruction memory partition and wherein the different physical memory regions, corresponding to the first data set and the second data set, correspond to a data memory partition;

wherein the instruction memory partition and the data memory partition correspond to different address spaces in a physical memory system;

wherein a data address in the third virtual memory region is determined based on a start address corresponding to a first Program Counter (PC) and an offset;

wherein a physical address in a second physical memory region, corresponding to the third virtual memory region, is determined based on a start address corresponding to the first Program Counter (PC) and the offset;

wherein each of the first PU and the second PU are associated with a same data offset to be applied when accessing the first set of data and the second set of data, respectively;

wherein the first virtual memory region and the second virtual memory region are (a) in a same virtual memory block and (b) have starting addresses that are set apart from each other by an offset value that is larger than or equal to memory space required to store the first set of instructions; and wherein the operations further comprise executing a guest, in a para-virtualized environment, associated with at least the first set of instructions and the first set of data.

14. A method comprising:

configuring a same particular offset value for separating virtual memory regions corresponding to respective instruction sets and separating virtual memory regions corresponding to respective data sets;

identifying a first virtual memory region corresponding to a first set of instructions to be executed by a first Processing Unit (PU);

identifying a second virtual memory region corresponding to a second set of instructions to be executed by a second Processing Unit (PU);

wherein the first virtual memory region and the second virtual memory region are separated by the particular offset value;

mapping both the first virtual memory region and the second virtual memory region to a same particular physical memory region;

identifying a third virtual memory region corresponding to a first data set to be processed by the first PU for execution of the first set of instructions;

identifying a fourth virtual memory region corresponding to a second data set to be processed by the second PU for execution of the second set of instructions;

wherein the third virtual memory region and the fourth virtual memory region are separated by the particular offset value;

mapping the third virtual memory region and the fourth virtual memory region to different respective physical memory regions;

executing (a) a first instruction, in the first set of instructions, using Program Counter (PC) relative addressing for referencing the first data set and (b) a second instruction, in the second set of instructions, using Program Counter (PC) relative addressing for referencing the second data set, wherein the first instruction and the second instruction correspond to the same instruction and include the same PC relative address.

15. The method of claim 14, wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region.

16. The method of claim 14, wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions.

17. The method of claim 14, wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region; and wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions.

18. A system comprising:

a plurality of Processing Units (PUs);

a physical memory;

the system being configured to perform operations comprising:

configuring a same particular offset value for separating virtual memory regions corresponding to respective instruction sets and separating virtual memory regions corresponding to respective data sets;

identifying a first virtual memory region corresponding to a first set of instructions to be executed by a first PU of the plurality of PUs;

identifying a second virtual memory region corresponding to a second set of instructions to be executed by a second PU of the plurality of PUs;

wherein the first virtual memory region and the second virtual memory region are separated by the particular offset value;

mapping both the first virtual memory region and the second virtual memory region to a same particular physical memory region of the physical memory;

identifying a third virtual memory region corresponding to a first data set to be processed by the first PU for execution of the first set of instructions;

identifying a fourth virtual memory region corresponding to a second data set to be processed by the second PU for execution of the second set of instructions;

wherein the third virtual memory region and the fourth virtual memory region are separated by the particular offset value;

mapping the third virtual memory region and the fourth virtual memory region to different respective physical memory regions of the physical memory;

executing (a) a first instruction, in the first set of instructions, using Program Counter (PC) relative addressing for referencing the first data set and (b) a second instruction, in the second set of instructions, using Program Counter (PC) relative addressing for referencing the second data set, wherein the first instruction and the second instruction correspond to the same instruction and include the same PC relative address.

19. The system of claim 18, wherein mapping both (a) the first virtual memory region corresponding to the first set of instructions and (b) the second virtual memory region corresponding to the second set of instructions to the same particular physical memory region results in the first PU and the second PU executing a same set of instructions stored in the particular physical memory region.

20. The system of claim 18, wherein mapping (a) the third virtual memory region corresponding to the first data set and (b) the fourth virtual memory region corresponding to the second data set in different respective physical memory regions results in the first PU and the second PU manipulating different data sets stored in the different respective physical memory regions.

* * * * *

UNITED STATES PATENT AND TRADEMARK OFFICE
CERTIFICATE OF CORRECTION

PATENT NO. : 9,652,274 B2  
APPLICATION NO. : 14/563608  
DATED : May 16, 2017  
INVENTOR(S) : Leonid Shatz Page 1 of 1

It is certified that error appears in the above-identified patent and that said Letters Patent is hereby corrected as shown below:

On the Title Page

The Assignee, Item (73), "Redwood Shores, CA (US)" should be changed to --Ra'anana (IL)--.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*